United States Patent [19]

Yang

[11] Patent Number: 4,472,892
[45] Date of Patent: Sep. 25, 1984

[54] PERPETUAL CUBIC CALENDAR

[76] Inventor: Rong J. Yang, 242, Ta-Long St., Taipei, Taiwan

[21] Appl. No.: 440,300

[22] Filed: Nov. 9, 1982

Related U.S. Application Data

[63] Continuation-in-part of Ser. No. 252,670, Apr. 20, 1981, abandoned.

[30] Foreign Application Priority Data

Feb. 10, 1981 [JP] Japan .............................. 56-18128[U]

[51] Int. Cl.³ .............................................. G09D 3/00
[52] U.S. Cl. ....................................... 40/107; 434/403
[58] Field of Search ................. 40/107, 109, 489, 618, 40/622; 434/407, 403

[56] References Cited

U.S. PATENT DOCUMENTS

| 166,796 | 8/1875 | Miller | 40/107 |
| 1,315,077 | 9/1919 | Barclay | 40/618 |
| 1,635,927 | 7/1927 | Curtis | 40/109 |
| 2,386,114 | 10/1945 | Hayes | 434/403 |
| 2,444,768 | 7/1948 | Eby | 434/403 |
| 3,670,436 | 6/1972 | Weissman | 40/107 |
| 3,864,859 | 2/1975 | Kaufman | 40/107 |
| 4,188,734 | 2/1980 | Rich | 434/200 |
| 4,194,196 | 3/1980 | Mohiuddin | 340/711 |
| 4,275,516 | 6/1981 | Lane | 40/109 |
| 4,358,906 | 11/1982 | Reininga | 40/107 |

FOREIGN PATENT DOCUMENTS

| 1098735 | 8/1955 | France | 40/107 |
| 2419553 | 10/1979 | France | 40/107 |

Primary Examiner—John J. Wilson
Attorney, Agent, or Firm—Cushman, Darby & Cushman

[57] ABSTRACT

A kind of device on the surface of which numbers, illustrations, or colors are arranged to show the year, month, day, or week is disclosed. Also, puzzles can be provided according to the invention for intellectual play purposes. A plurality of wooden pegs having either a cubic, rectangular, or cylindrical shape are provided wherein on each peg, indicia, such as, numbers, colors, illustrations are placed so as to show the year, month, day, week, or graphical illustrations and/or beautiful designs depending upon the arrangement of the pegs.

6 Claims, 10 Drawing Figures

PERPETUAL CUBIC CALENDAR

RELATED APPLICATIONS

This application is a continuation-in-part of my co-pending U.S. patent application Ser. No. 252,670 filed Apr. 20, 1981 and entitled "Cubic Calendar", now abandoned.

BACKGROUND AND SUMMARY OF THE INVENTION

The present invention utilizes different arrangements of wooden pegs on each of which are disposed predetermined indicia, such as, numbers, illustrations, or colors to show, for example, the year, month, day, and/or week, similar to a conventional calendar in order to effect the "universal cubic calendar" of the present invention.

There, of course, exists some prior designs of calendars on which the year, month, day, or week, are depicted on carved wood pieces having small apertures to hang each of the numbers to which that year, month, or day belongs. However, the present invention not only shows the year, month, and/or day, but also, can be utilized as a "perpetual calendar" (e.g. one in which any month, day, or year can be depicted).

The present invention is a type of decorative calendar, but may be convertible to what is hereinafter referred to as a "perpetual cubic calendar". Also, the present invention can function as an illustration combination, numerical arrangement, or a puzzle game for children's educational purpose. Rectangular pieces or pegs of wood, can be utilized and the size thereof depends upon the size of numbers, year, month, or day to be shown. To increase useable space, the pegs may be either cubic or cylindrical in shape, one side of which depicts numbers while the other side depicts specific colors or illustrations.

DETAILED DESCRIPTION OF THE PREFERRED EMBODIMENTS

This present invention combines the advantageous qualities of a decorative calendar, decorative tearing calendar, convertible number calendar, or the like into one simplified unit. Various predetermined illustrations can be compiled and numbers thereon can be rearranged for special purposes. Specific dates or illustrations can be arranged to aid a child's education, for example.

Figure 1:
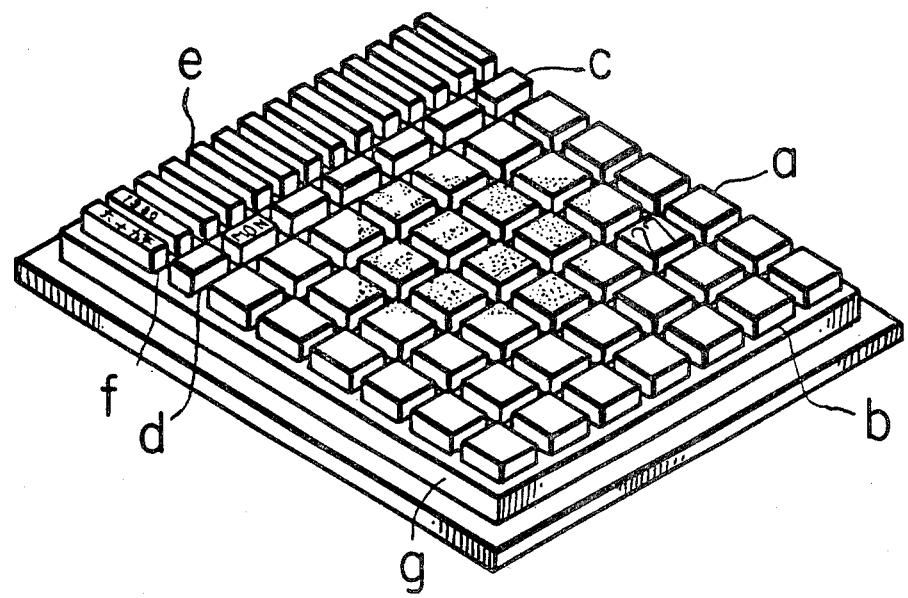
FIG. 1 is a perspective view of one embodiment of the universal cubic calendar according to the present invention.
Figure 2:
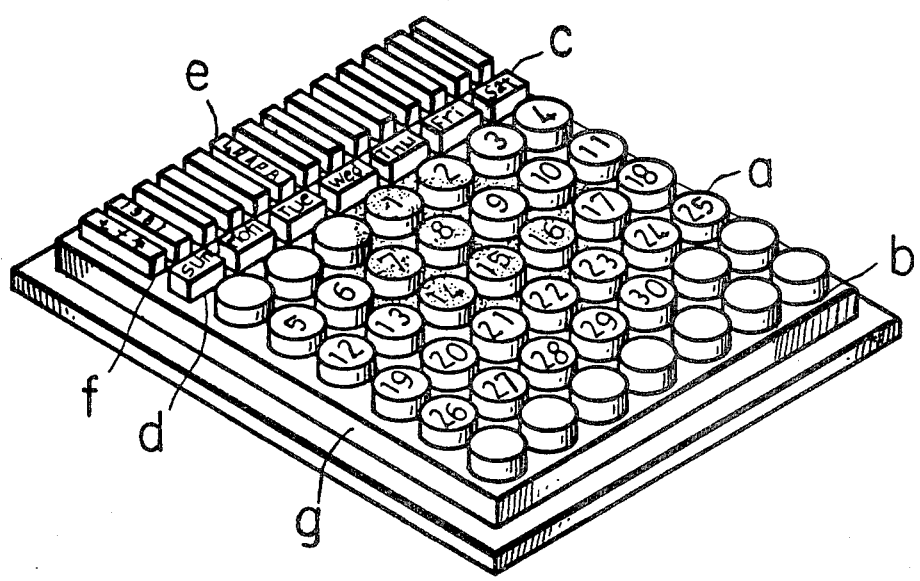
FIG. 2 is a perspective view of another embodiment of the universal calendar according to the present invention.

Referring to FIGS. 1 and 2, it can be seen that the present invention comprises pegs of wood (a) some of which are provided with numerals so that consecutive numerical indicia from 1 to 31 are provided. Holes (b) are provided in which numerical pegs (a) can be slidably registered. Seven columns of numerical recesses (b) are provided corresponding, of course, to the seven days in a week. Thus, in predetermined ones of the numerical recesses (b) in the seven columns, numerical pegs (a) can be registrably accepted in a predetermined array to form any calendar month of any year.

Above each of the seven columns mentioned above, there is similarly provided a row of day recesses (d) in each of which a day peg (c) each showing one of the particular days of the week (e.g. Saturday, Sunday, Monday, etc.) can be slidably registrable.

At least 12 monthly recesses (f) are provided above the day recesses (d) in each of which one month peg (e) each showing one of the twelve months (e.g. January, February, March, etc.) of a calendar year can be slidably registrable.

Of course, pegs (a), (c), and (e) and recessed (b), (d) and (f) can be of any geometrical shape as long as each peg and its corresponding recess are capable of slidably registering with one another. Further, the peg (e) may be used for indicating the faces (2), (3), and (4) by turning it, and the months may also be indicated with its left or right side.

Figure 3:
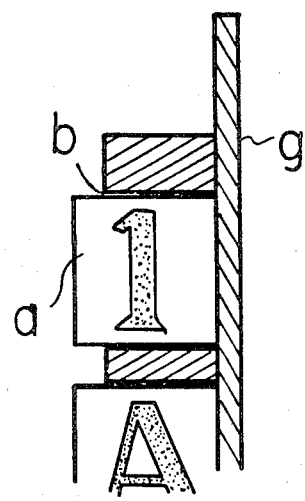
FIG. 3 is a partial cross-sectional view of one embodiment of the peg mounting arrangement according to the present invention.
Figure 4:
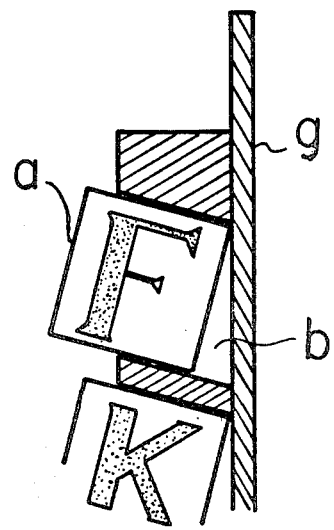
FIG. 4 is a partial cross-sectional view of another embodiment of the peg mounting arrangement according to the present invention.
Figure 5:
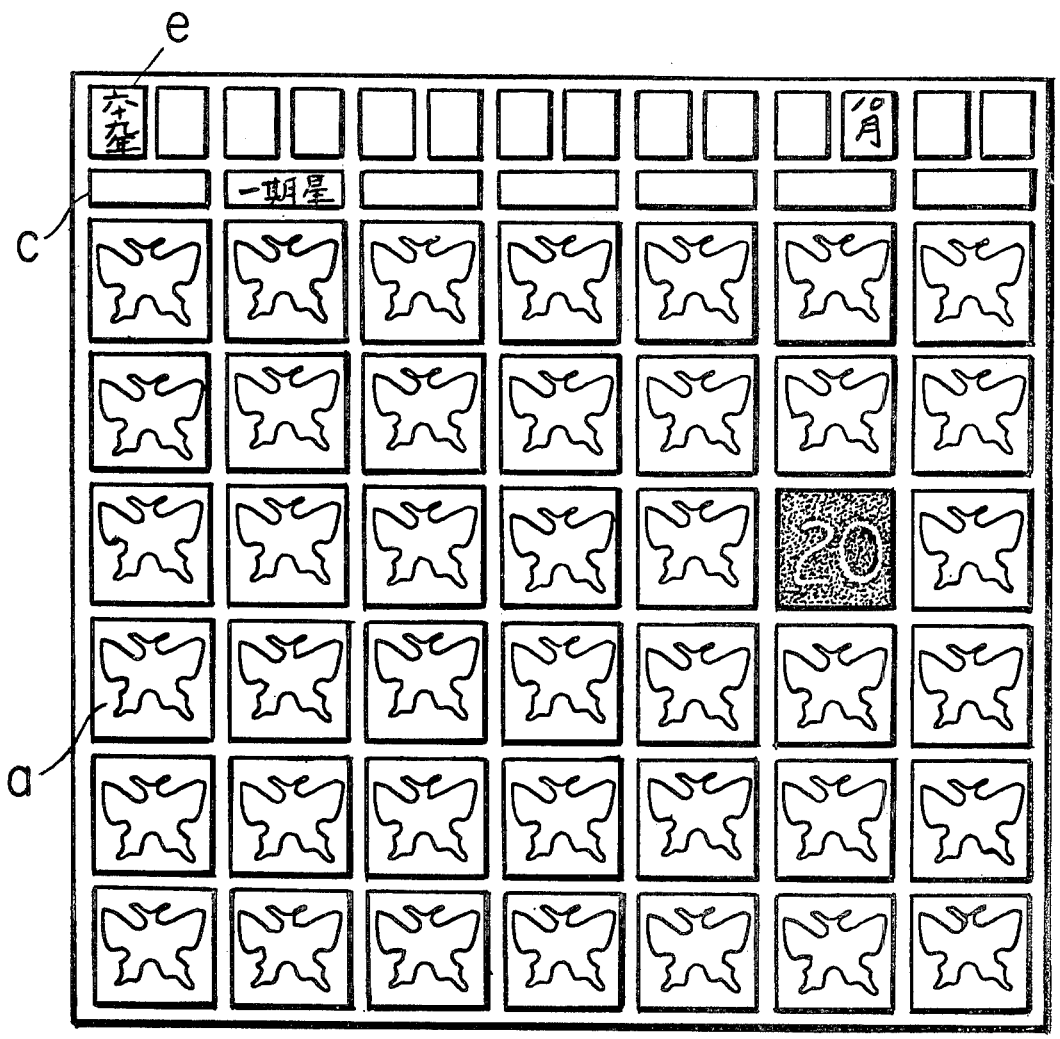
FIG. 5 shows an embodiment of this invention.

According to the present invention, the pegs can be set perpendicular to base (g) (see, FIG. 3) or inclined laterally relative to base (g) (see FIG. 4) as desired. Thus, rectangular pegs can be utilized showing the year, month, and day wherein the useable space is the same or, according to the present invention, an enlarged surface space may be utilized so that other pegs can be supplied for other purposes, and can be embodied in cubic or cylindrical shape or the like. Numbers can be provided on one side of the pegs, and desired illustrations can be printed on the other side thereof.

Figure 6:
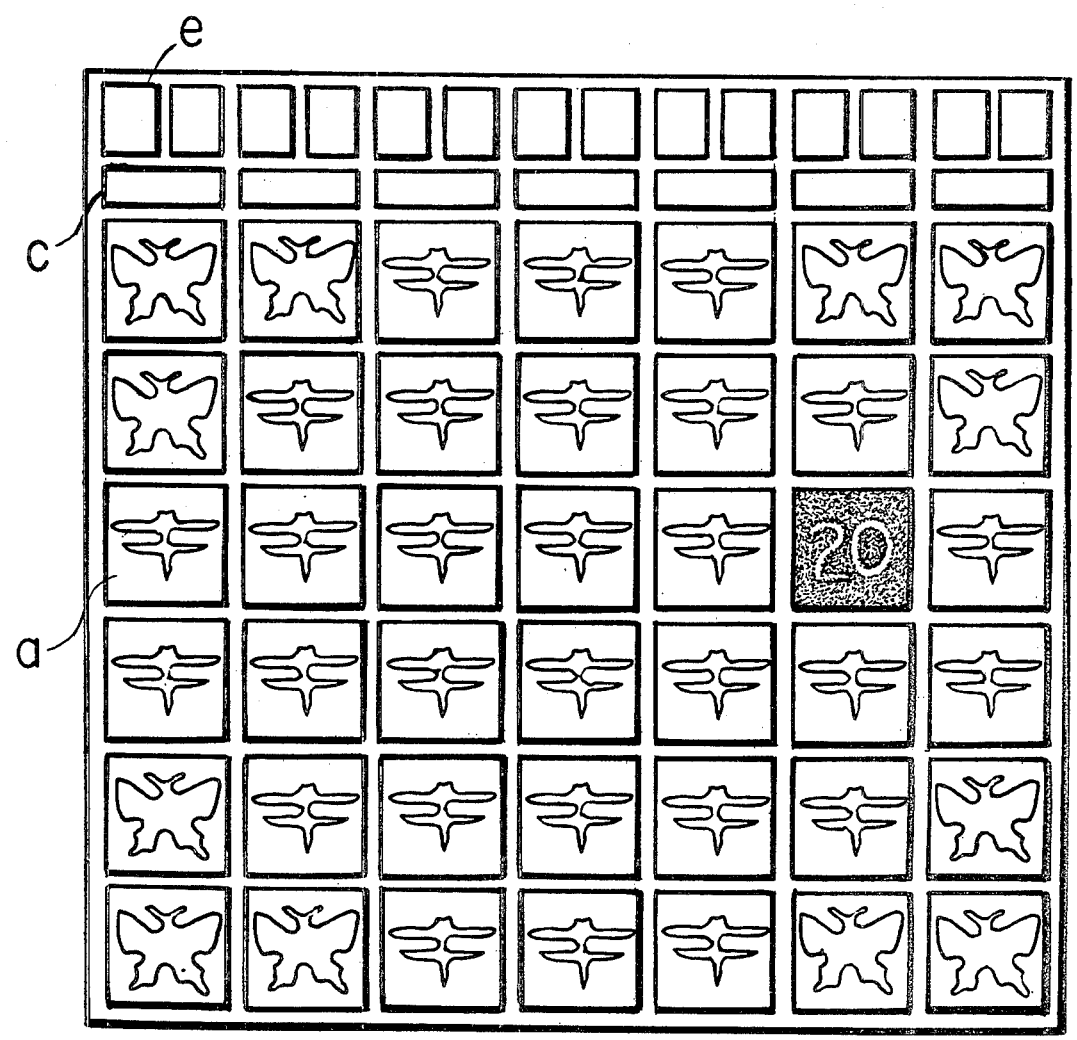
FIG. 6 shows an embodiment of this invention.
Figure 7:
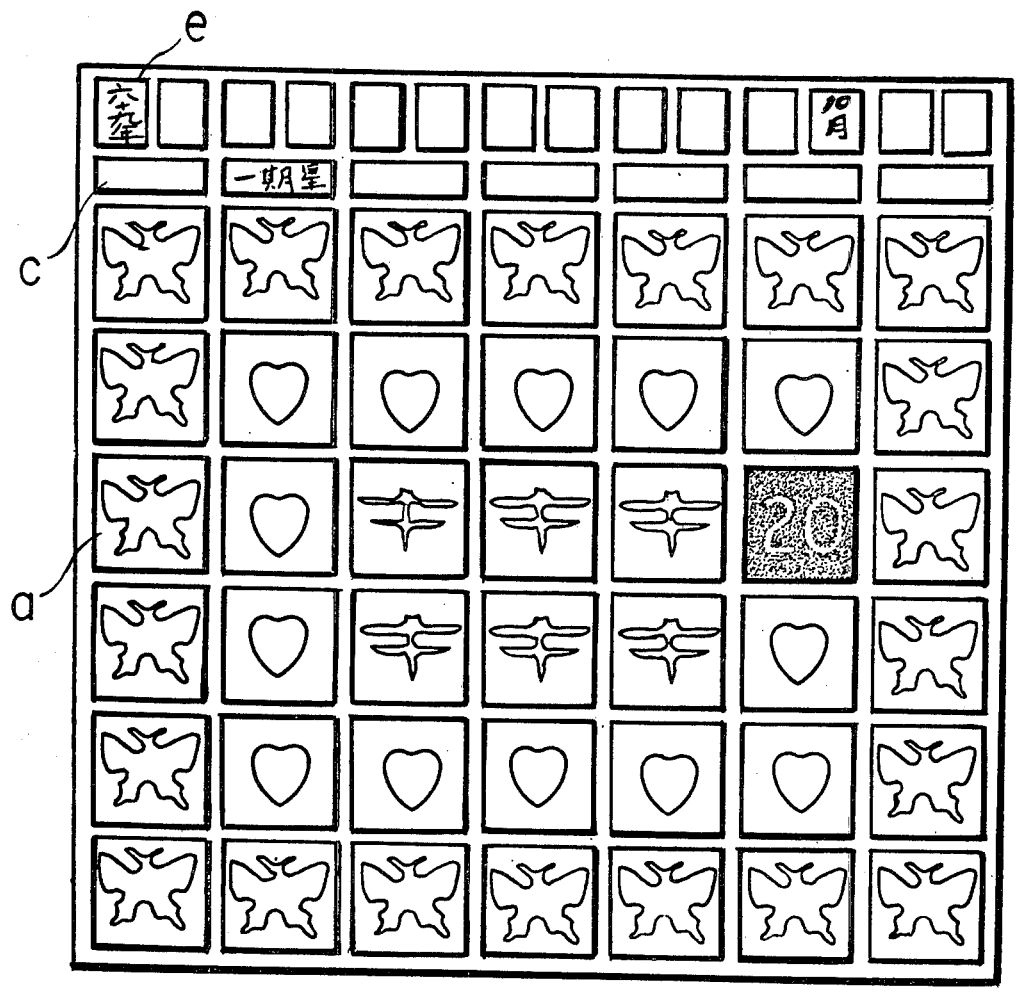
FIG. 7 shows an embodiment of this invention.

The design of this invention provides a panel having multi-variation which is valuable in skillfulness practice and in education. Each cubic inserting block has six faces, which may optionally be turned to have any one predetermined face facing outwards. Each of faces, except the one of them being used to indicate a calendar numeral of the day, may be used to indicate a single pattern, such as a butterfly, a drangonfly, a peach, a tiger, a lion, etc., or fruit, or others. In practice, one face is used to indicate the calendar numeral of the day, while the remaining five faces may be used so as to individually illustrate a desired pattern such as the butterfly pattern as shown in FIG. 1. By the same token, the whole panel may be used to display one single pattern in mosaic fashion, such as, a dragonfly, peach, or tiger, etc., so as to have the whole panel look uniform and beautiful. Simultaneously, more than two different patterns may be arranged in one panel in irregular arrangement as shown in FIGS. 6 and 7. One type of pattern may be arranged in one row or one column, or vice versa. In other words, the present invention may be arranged into thousands and thousands of different combined patterns through proper combination and permutation depending upon one's desire.

Figure 8:
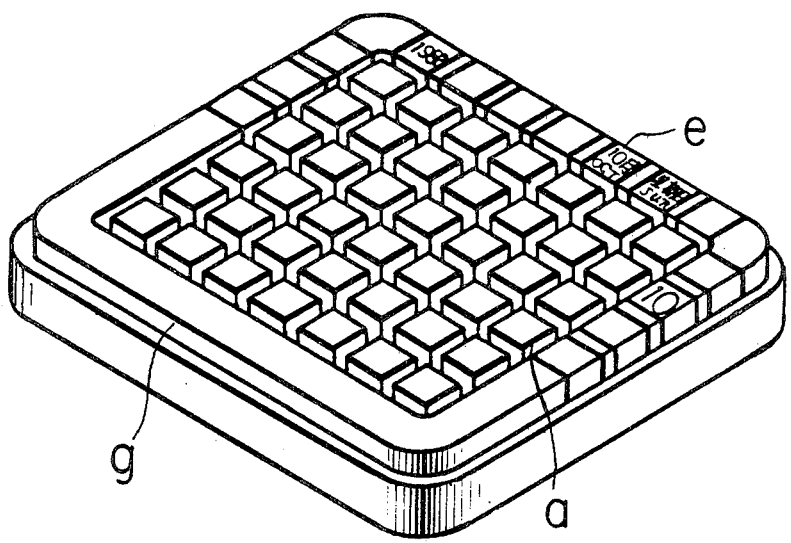
FIG. 8 shows an embodiment of this invention.

FIG. 8 shows an embodiment of this invention, in which a cubic peg (or inserting block) is provided on the front face of the planar base. The pegs may be placed in the recesses (or niche) with 2 or 5 of its sides facing outwards to show the year, or month, or week day. Use the pegs at both sides (four pegs at right, and three pegs at left) to show the date, and each of said pegs has fine faces to be turned and shown. The pegs in the inner part may have different color coatings so as to change the color of the whole panel.

Figure 9:
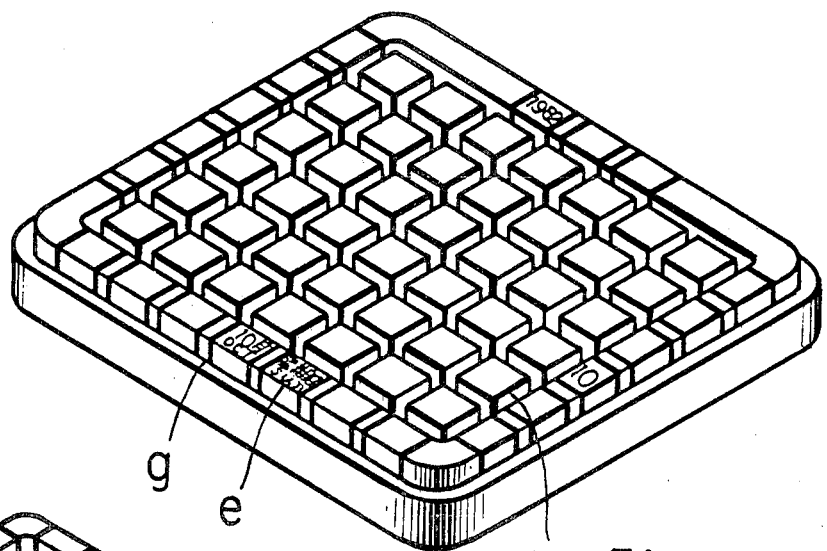
FIG. 9 shows an embodiment of this invention.

FIG. 9 shows another embodiment of this invention, in which rectangular pegs (or inserting blocks) are inserted along the circumference of the planar base. Each of the pegs may be turned and shown with its four faces. The pegs on the top circumference may be used for showing the year at different positions. The pegs at the bottom circumference may be used for showing the months and the week days. The pegs at the both sides of the circumference may be used for indicating the date (five pegs at the left side, and six pegs at the right, and each peg can be turned with four faces, but three faces to show the date, and one face is blank). The pegs in the central part of the planar base may be arranged in different colors so as to change the color of the whole panel.

Figure 10:
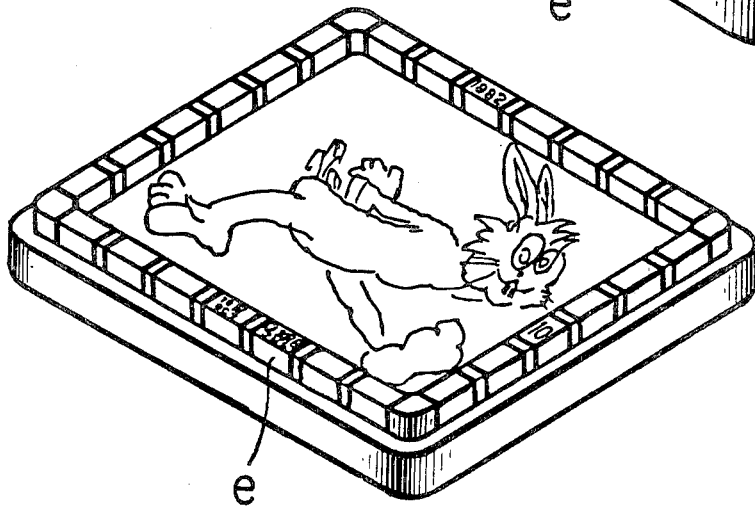
FIG. 10 shows an embodiment of this invention.

FIG. 10 shows a still another embodiment of this invention, in which rectangular pegs are inserted along the circumference of said planar base, each of the pegs may be turned so as to expose one of four faces at the given time. The pegs on the top circumference show the year; the pegs on the bottom circumference show the months and the week-days. The pegs on both sides show the date. The space in the central part of the planar base may be decorated with various kinds of animals, flowers, or grass patterns to increase the integral beauty.

I claim:

1. A perpetual cubic calendar comprising:
a substantially planar base defining a plurality of first recesses arranged in said base as a matrix consisting of seven horizontal rows and seven vertical columns, said base further defining a row of at least twelve second recesses horizontally disposed above said seven rows;
a plurality of first pegs corresponding in number to said first recesses of said matrix each removeably slidably registered with a predetermined one of said first recesses, only those of said first pegs registered with said first recesses along the uppermost row thereof including surfaces bearing first word indicia indicating a predetermined day of the week, and predetermined ones of the remainder of said first pegs including (a) indicia-bearing surface on one end thereof bearing numerical indicia of the number one up to and including number thirty-one, each of said predetermined ones of said first pegs bearing only one of said numerical indicia, and (b) at least one color-bearing surface bearing a predetermined color whereby said first pegs are arrangeable in said first recesses with either said indicia-bearing surfaces or said color-bearing surfaces visible in a desired combination so as to exhibit in a predetermined manner the date in addition to establishing a mosaic pattern to form selected designs with said color-bearing surfaces; and
at least twelve second pegs each removeably slidably registered with a predetermined one of said second recesses, each of said second pegs including a surface bearing second word indicia indicating a predetermined month of the calendar year.

2. A perpetual cubic calendar as in claim 1 wherein each of said first and second pegs is a perpendicular parallelpiped, and wherein each of said first and second recesses defines upper and lower parallel opposingly separated surfaces, said upper and lower surfaces being inclined relative to said substantially planar base to establish an inclined complimentary angle relative to said planar base of each of the visibly exposed surfaces of said first and second pegs slidably registered in said first and second recesses, respectively.

3. A perpetual cubic calendar as in claim 2; wherein each of said first pegs registered with said first recess means along said uppermost horizontal row has a width dimension as measured in the vertical direction less than the length dimension as measured in the horizontal direction, said width and length dimensions being perpendicular to one another.

4. A perpetual cubic calendar as in claim 2, wherein each of said remainder of said first pegs has identical width and length dimensions perpendicular relative to one another.

5. A perpetual cubic calendar as in claim 1 wherein said first and second recessed surfaces each includes top and bottom opposing surfaces, and right and left opposing surfaces, said top and bottom surfaces being parallel with respect to one another and defining an angle relative to said planar base so that said first and second pegs registered in said first and second recesses, respectively, are similarly inclined relative to said planar base.

6. A universal calendar, comprising:
a substantially planar base including a plurality of first recess means each defining first recessed surfaces arranged in said base as a matrix consisting of seven horizontal rows and seven vertical columns, said base further including a month row horizontally disposed above said seven rows having at least twelve second recess means each defining second recessed cavities,
a plurality of first pegs each removeably slidably registered with a predetermined one of said first recess means, only those of said first pegs registered with said first recess means along the uppermost horizontal row thereof including surfaces bearing first word indicia indicating a predetermined day of the week, and predetermined ones of the remainder of said first including surfaces bearing numerical indicia of the numbers one up to and including the number thirty-one, each of said predetermined ones of said first pegs bearing only one said numerical indicia; and
at least twelve second pegs each removeably slidably registered with a predetermined one of said second recess means, each of said second pegs including a surface bearing second word indicia indicating a predetermined month of the calendar year, wherein each of said first and second pegs is a perpendicular parallelpiped, and wherein each of said first and second recess means defines upper and lower parallel opposingly separated surfaces, said upper and lower surfaces being inclined relative to said substantially planar base, to establish an inclined complimentary angle relative to said planar base of each of the visibly exposed surfaces of said first and second pegs registered in said first and second recesses, respectively.

* * * * *